May 16, 1944.  L. R. N. CARVALHO  2,348,957
APPARATUS FOR AND METHOD OF MAKING CIRCULAR
LOCKING BANDS FOR CAPS OR CLOSURES
Filed Sept. 12, 1941  4 Sheets-Sheet 1
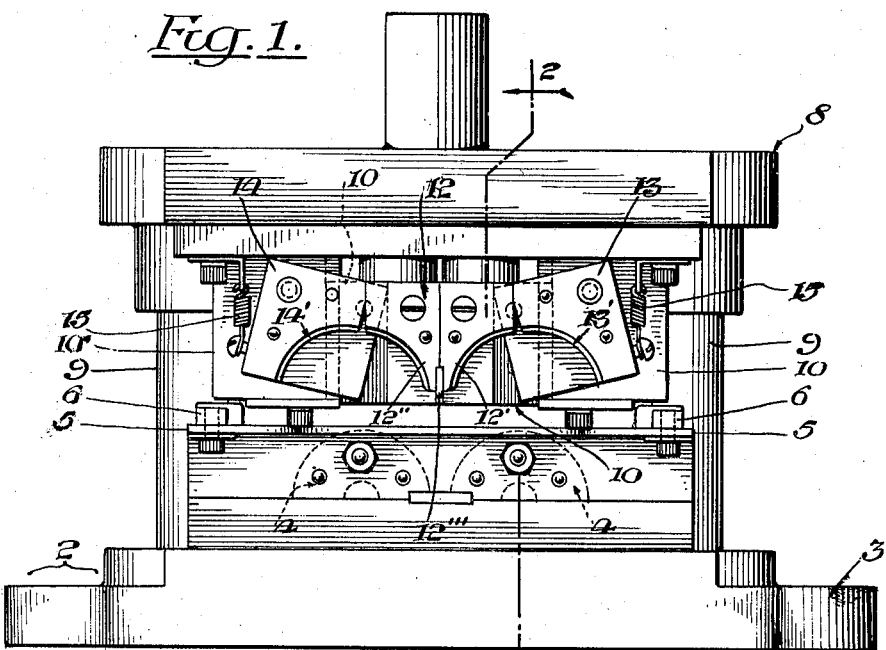
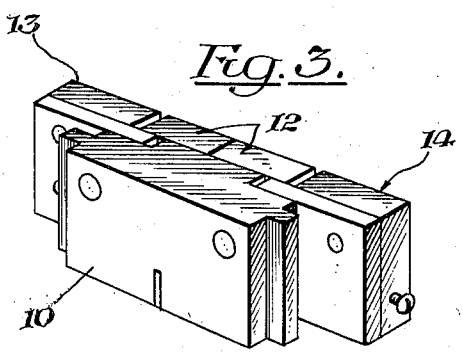
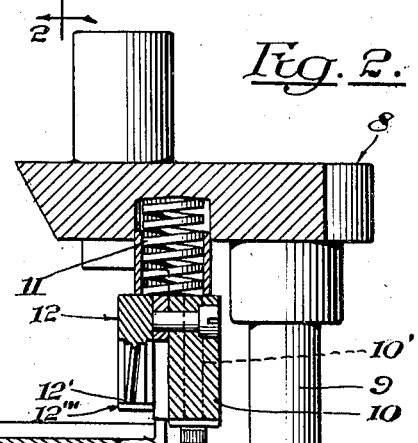
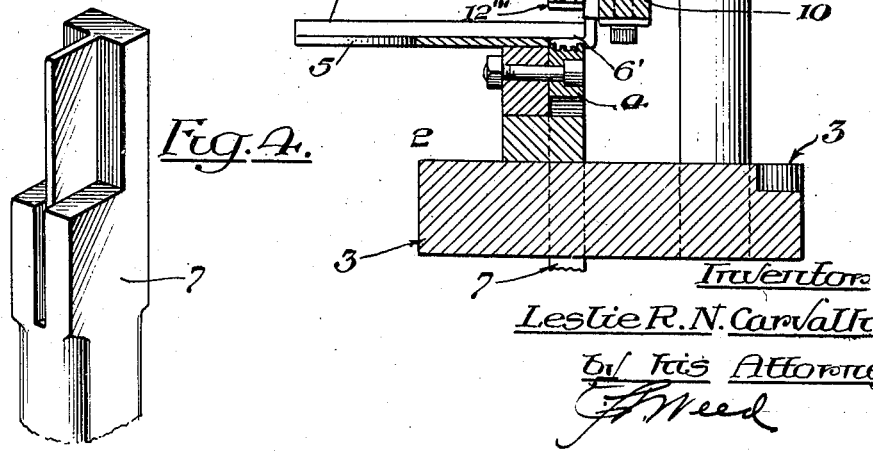
Inventor
Leslie R. N. Carvalho
by his Attorney May 16, 1944.　　L. R. N. CARVALHO　　2,348,957
APPARATUS FOR AND METHOD OF MAKING CIRCULAR
LOCKING BANDS FOR CAPS OR CLOSURES
Filed Sept. 12, 1941　　4 Sheets-Sheet 2

Inventor
Leslie R. N. Carvalho
by his Attorney

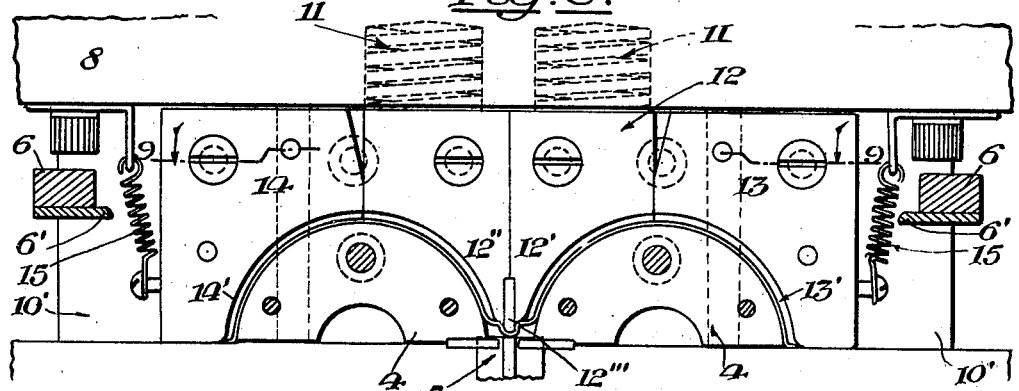
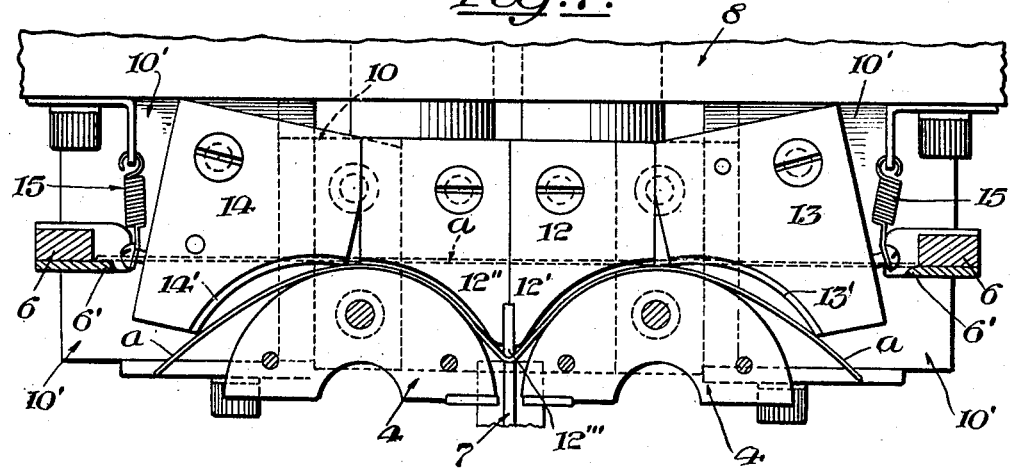
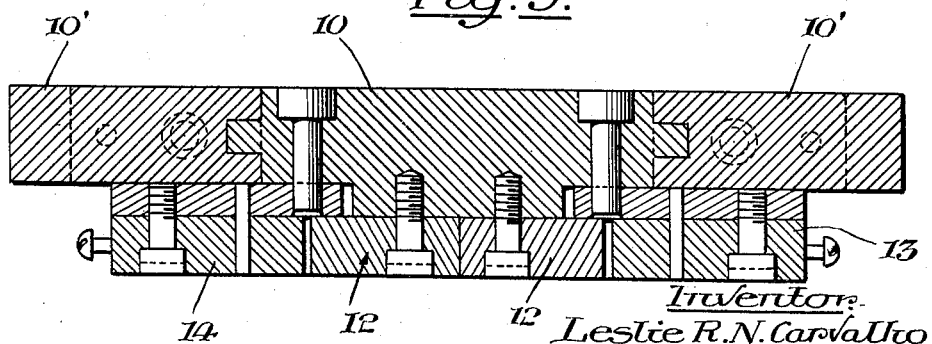

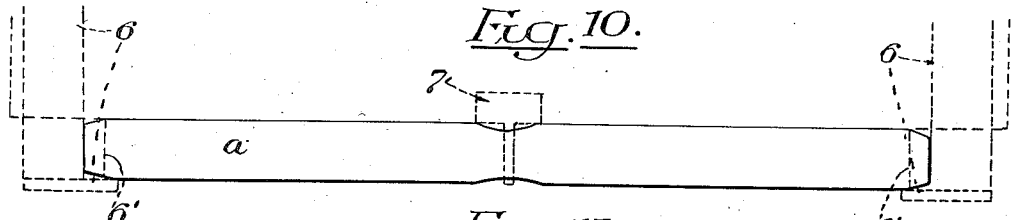
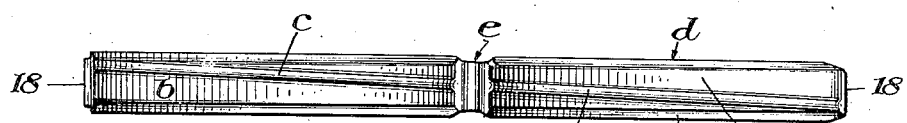
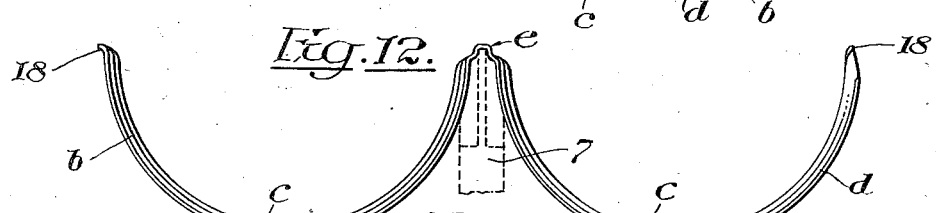
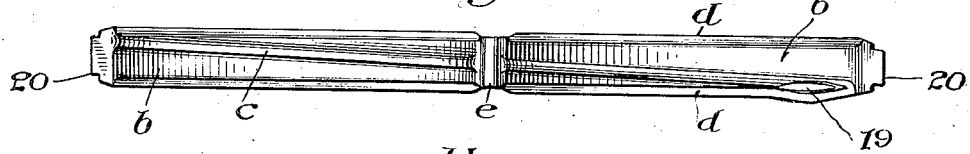
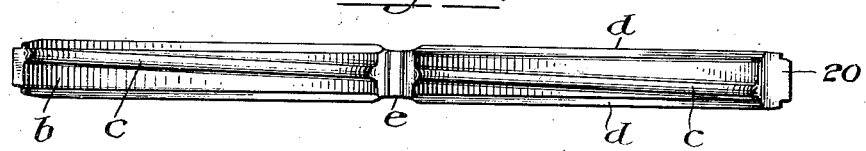
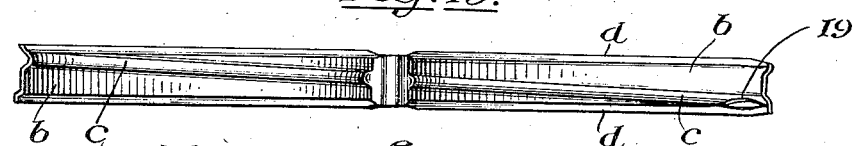
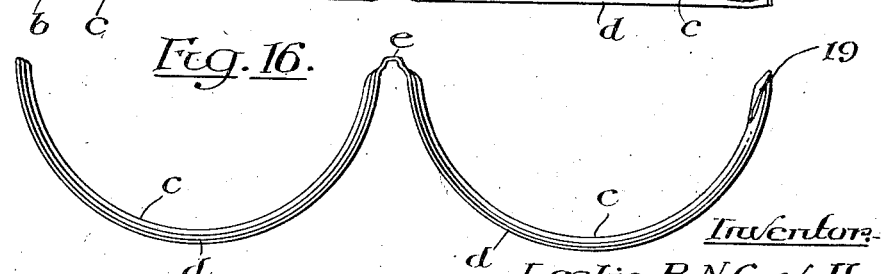

Patented May 16, 1944

2,348,957

UNITED STATES PATENT OFFICE 2,348,957

APPARATUS FOR AND METHOD OF MAKING CIRCULAR LOCKING BANDS FOR CAPS OR CLOSURES

Leslie R. N. Carvalho, New York, N. Y., assignor to Crown Cork & Seal Company, Inc., Brooklyn, N. Y., a corporation of New York Application September 12, 1941, Serial No. 410,622

11 Claims. (Cl. 153—7)

This invention relates to an apparatus for and method of making circular locking, such as threaded bands for use with cap or closure shells, thereby to provide an improved concealed locking or thread closure or cap for glass or other containers and, more particularly, it relates to the dies and method by which these bands are efficiently and economically produced without endwise stretching of the metal strip or the formation of split and defective threads.

In the formation of what are known as concealed thread caps, it has been attempted, when a band is used to carry the thread, to roll the thread on the band or strip as the strip is being curled and then solder or overlap the ends of the strip when applied to the shell, relying upon expansion of the band to take up variation in the glass finish but it is difficult to assemble such a band with the cap shell since, when the band comes out of the curling unit, it is spiral in form and does not set snugly in the outer cap shell. However, by means of the present improved dies, the strip can be die-stamped to form the band, thus avoiding this spiral formation so that when the band is bent at its hinge-connected portion, it forms a perfect ring with the ends of the band abutting, no overlapping or soldering thereof being necessary.

Because of the difficulties referred to in forming the thread in the band and assembling such band with the cap, most of the present day concealed thread closures are made with an outer and an inner shell, each a complete shell, the latter carrying the thread, but this is expensive and also has other disadvantages.

In the present improvement, the thread is carried by a simple improved band so that there is considerable saving of metal and time both in manufacturing and assembling since the entire top of the inner shell is dispensed with. In short, the present method of making this cap by forming the band in the improved manner hereinafter disclosed, that is, stamping the band with its thread instead of rolling it in a threading machine as heretofore, not only results in a more perfectly shaped band and thread but also a steeper thread, that is, one which has greater angularity than a rolled thread, thus providing a thread with a relatively flat thread engaging surface whereby greater variation in the glass finish is permissible.

By this improved die apparatus and method, therefore, not only is the threaded band formed in a more practical and economical way but it is more readily assembled to form a perfect ring with the ends abutting and without overlapping and having no exposed edges to the metal and whereby, also, either edge of the band may be inserted into the shell since the thread starts and terminates at both ends of the strip opposite the hinge thereof and whereby, also, the annular outer margins or rims of the band above and below the thread will extend in parallelism with the shell skirt and engage throughout their width against the inner wall of the shell, obtaining not only a perfect support for the threaded band but forming annular shoulders to insure retention of the liner in the cap.

As the thread is stamped out, it therefore has a greater angularity than a rolled thread to provide relatively flat thread engaging surfaces which are highly desirable. It is well known that you cannot get a square or angular thread in a rolling machine, that is, a flat thread or a thread having a flat thread engaging surface such as is obtained by stamping out the thread.

Cap companies, for years, have been trying to produce a thread with a flat top surface for this would be the ideal thread and the reason for this is that there are two kinds of pressure in applying a screw cap to a container, one a sealing pressure and the other a wedging pressure. When the wedging pressure exceeds the sealing pressure, the cap will cock up on one side of the glass under certain conditions eliminating any possibility of obtaining a uniform pressure on the liner to get a real seal and this is because, when the glass thread of the jar or container and the thread on the cap are similarly formed with curved surfaces—and a rolled thread must have a curved surface—the thread on the cap rides up on the curved thread of the container. With the ordinary rolled thread there is also difficulty in unscrewing a cap from a jar because it wedges whereas, with the present stamped-out thread, a better seal is obtained and yet the cap will come off more easily than if the thread is rolled.

The best thread that could be used on a glass jar or cap is a square-sided or angular thread, that is, one having a flat engaging surface but glass manufacturers do not make that kind of a glass thread but only threads with curved surfaces although they endeavor to give the under side or engaging side of the thread a flat surface where it approaches the jar. Consequently, a thread on a cap that will have this flat engaging surface, even though it be used in connection with the thread on a jar as now made with curved surfaces, has a better engaging and holding face than if it had a curved engaging surface and the present stamped-out thread more nearly approaches that desirable feature and which can only be obtained by stamping it out for it cannot be made by rolling for the reasons set forth. Furthermore, this stamped-out thread permits a greater variation in the glass thread or finish of the jar to be taken up than is possible with a rolled thread.

Thus, in the present improvement, as the thread is stamped-out, it has a flatter surface on the top and bottom to engage the thread, glass or otherwise, of the container since the corners are more abrupt or angular than that of any rolled thread could possibly be for the simple reason that the rolls of a rolling machine cannot form angular corners in the metal such as are made by stamping.

It has been found impossible, by practical experience, to produce a pair of united or hinged semi-circular band-formed sections by dies where these dies are of solid formation without excessive endwise stretching of the metal or injuring or breaking the threads but, by means of the present improved dies, uniformly formed bands can be obtained without stretching the metal endwise or in any way injuring the threads, it being obvious that, unless the bands are uniform, they would be useless.

The bands are shown formed at their outer margins with a pair of relatively narrow annular rims $d$ (see Fig. 11) spaced apart by a relatively wide raised panel $b$ carrying the stamped-up thread $c$, shown as a single thread, the pair of outer rims $d$ being in position to parallel and rest firmly against the inner wall of the shell flange or skirt of the cap throughout their width and are supported thereby in a firm and practical manner. These annular rims $d$ are, as stated, separated by a relatively wide raised thread-carrying panel $b$, the thread of which is shown starting and terminating at the free ends of the band opposite the hinge thereof, which formation permits the band to be readily inserted in the shell with either edge at the top thereof while the relatively wide panel carrying the thread is in position efficiently to take up any variation in the glass finish of the container.

In the drawings accompanying and forming a part of this specification,

Fig. 1 is a front view of the assembled die.

Fig. 2 is a transverse sectional view on line 2—2 of Fig. 1.

Fig. 3 is a perspective view of the slide portion of the die.

Fig. 4 is a perspective view of the blank stripper or knock-out member.

Fig. 7 is a view illustrating the first step in the formation of this improved band.

Fig. 8 illustrates the next succeeding step in the formation of the band.

Fig. 9 is a section on line 9—9 of Fig. 8.

Fig. 10 is a view of the metal blank or strip from which the band is formed in position to be stamped.

Fig. 11 illustrates the band after it is completely stamped.

Fig. 12 is an edge view thereof with the stripper in position.

Figs. 13, 14, 15 and 16 illustrate defective bands resulting from attempts to produce them by solid dies.

Similar reference characters indicate corresponding parts in the several views.

Figure 6:
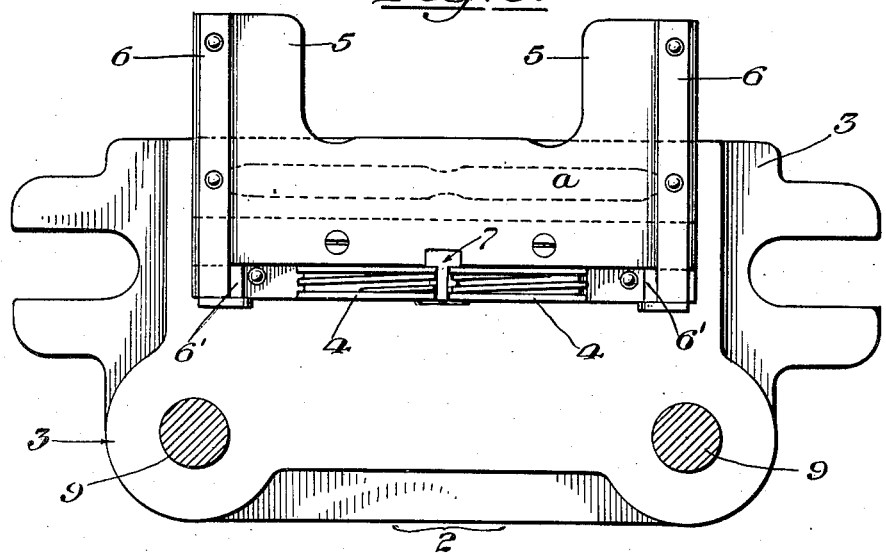
Fig. 6 is a partly sectional view on line 6—6 of Fig. 5.
Figure 5:
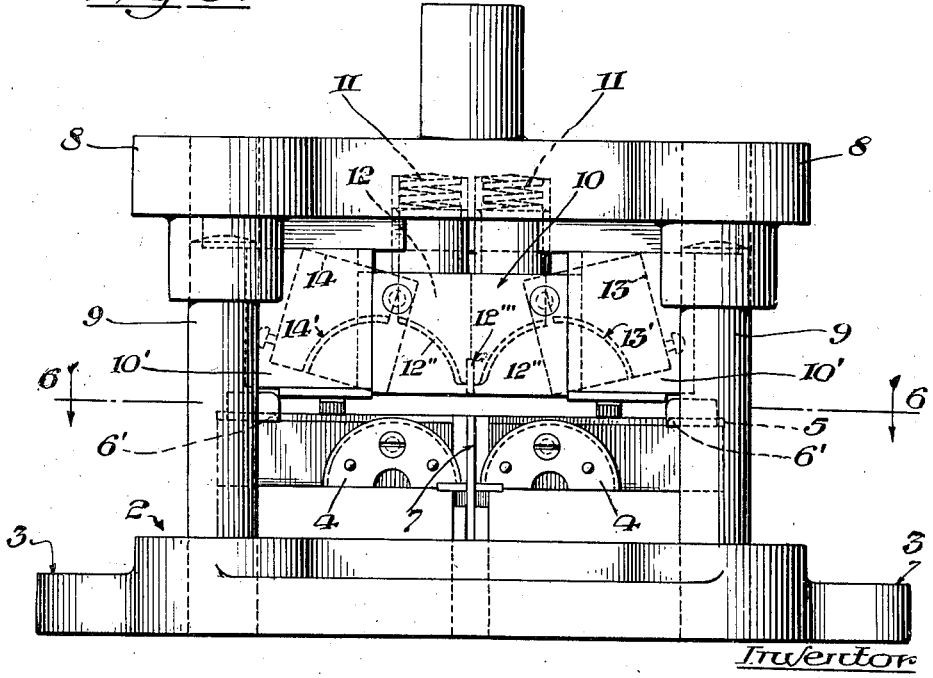
Fig. 5 is a rear view of Fig. 1.

Before explaining in detail the present improvement and its mode of operation, I desire it understood that the invention is not limited to the details of construction and arrangement of parts illustrated in the accompanying drawings since the invention is capable of other embodiments, and that the phraseology employed is for the purpose of description and not of limitation.

The lower or base half 2 of the die consists of a suitable support 3 carrying two half or semi-circular die blocks 4 suitably mounted on the base which also has a table 5 for guiding the blank strips $a$ into position to be formed. This table has suitable guiding or positioning means and gauges 6 and 6' for properly guiding and positioning the blanks. The half sectional blocks 4 are formed on their semi-circular peripheries so as to provide the stamped-up threaded panel $b$, $c$ having the pair of annular rims $d$ (Fig. 11). Between these center blocks 4 a blank control or movable knock-out 7 is located and guided properly to position and support a blank on its under side midway of its length, it being actuated by any suitable means, not shown, to knock out the completed band from the die.

The punch or upper half 8 of the die is shown supported for shiftable movement on a pair of upright posts 9 carried by the base and is provided with a sliding die-carrying member 10 so that, as the upper half 8 of the die is shifted downwardly toward the base 2, this sliding die member 10 will be shifted upwardly against the action of suitable elastic means such as rubber means or springs 11. This sliding die member 10 is suitably supported by guideways 10' formed on the upper half of the die and carries a series of sections, three or more, forming a pair of complete spaced semi-circular arches having their arcuate inner peripheries formed to cooperate with the outer peripheries of the die blocks 4.

As shown, the die sections carried by the slide 10 of the movable die member or punch 8 comprise a center section 12 fixed to the slide 10 and so formed as to provide a pair of spaced arc-shaped quarter sections 12' and 12" merging into a blank strip engaging portion 12'" so located as to engage the blank strip midway of its length directly above the knock-out member 7.

Shiftable in the arc of a circle relative to this center section 12 are a pair of wing sections 13 and 14, each likewise carried by the sliding member 10 and shown pivoted thereto and provided with arc-shaped inner peripheries 13' and 14' forming continuations of those on the fixed section. The adjoining edges of these sections 12, 13 and 14 are so formed as to permit the proper swinging movement of these wing sections.

These wing sections 13 and 14 are provided with springs 15 at their outer sides or ends for swinging them outwardly away from the center section.

In the operation of this improved die, the blank or strip $a$ is placed on or automatically fed to the table 5 of the lower die 2 with each end of the blank against a side gauge 6 to position the blank. In this position, the center of the blank strip rests upon the top of the knock-out 7 located directly underneath which serves partly to support the blank and, as before stated, this knock-out is held in position by some suitable pressure and serves the double purpose of supporting the blank at its under side while the center portion 12'" of the fixed die section holds the blank centrally of its length on its top face so that, by this means, travel of the blank is under control.

The action of the punch or upper half 8 of the die is two-fold. As it is shifted downwardly, the center part 12''' of the fixed center section 12 of the die presses against the top surface of the strip of blank 1 and the panel and thread portion of this fixed section are the first to engage and form part of the threads on the blank strip so that as this upper half of the die continues downwardly, the center part 12''' of the fixed section 12 first engages the upper surface of the blank midway of its length and clamps the strip and then the threads of this fixed center section 12 engage and form a part of the threads on the blank. As the punch or upper half 8 of the die continues downwardly, the wing sections 13 and 14 are shifted toward each other by reason of the fact that, as the upper half 8 of the die moves downwardly, the sliding section 19 thereof carrying these wing sections is forced upwardly against its elastic means or springs 11, thus completing the semi-circular panel and thread formation of the blank.

Therefore, as the punch or upper die member 8 moves downwardly, the blank is first engaged midway of its length by the center section 12 of the die cooperating with the knock-out member 7 and thus clamps it in contact therewith which prevents movement of the blank in any direction. As the top die or punch 8 continues to move down, the center section 12 starts the formation of the panel, thread and annular rims and further downward movement shifts the wing sections 13 and 14 toward each other by reason of the fact that the sliding member 19 carrying them is shifted upwardly on the punch or upper die against the action of the elastic means cooperating therewith, whereupon the threaded portion of the blank is completed.

This operation is shown in Figs. 7 and 8, Fig. 7 illustrating the position of the upper die or punch when it first engages the blank strip and the thread is partly formed by the fixed section 12 of the die, Fig. 7 also illustrating the position of the outer ends of the blank strip and wing sections 13 and 14 at this time, and Fig. 8 illustrating the position of the wings 13 and 14 when shifted toward each other and the complete formation of the band.

Thus, the upper die 8 moves down until the center portion of the fixed section 12 fully engages and clamps the blank, at which time the thread has not yet been formed but, as the upper die member or punch continues its downward movement, the die starts to form the thread from the center toward the outer ends and further downward movement of the die, by reason of the sliding movement of the die section carrying member 10 and the pressure of the elastic means thereon causes the wings 13 and 14 to be compressed toward the center portion of the die and so complete the formation of the thread and form the strip or blank into two semi-circular sections bendably mounted or hinged at their inner ends e, each provided with a raised panel b carrying a thread c and a pair of annular rims d forming liner retaining shoulders so that when these two semi-circular sections are bent at the hinge e to form a complete ring or band, it can be readily inserted into the cap shell and secured therein in any suitable manner as, for instance, by bending the lower edge of the shell skirt over one of the annular rims d.

During the formation of the band in the manner just described, the outer ends of the band are also bent outwardly to form a pair of angular portions 18 which engage each other when the band is bent into circular formation to prevent overlapping of the band in the cap.

As hereinbefore stated, attempts to make this improved band by means of solid dies without the wing sections has resulted in endwise drawing of the metal strip to such an extent that not only are the threads split or broken and imperfectly formed (see 19 in Figs. 13, 15 and 16) but the ends of the band are so drawn out as to provide an excess of metal in the band (see 20 in Figs. 14 and 15) thus preventing its insertion into the cap shell and while, in practice, the metal of the blank made in the way shown and described herein is stretched slightly sidewise to form the panel rims and thread, there is virtually no lengthwise stretching as is the case where solid dies are used.

After the blank is properly formed, the upper die moves upwardly and the stripper or knock-out 7 is actuated to release the blank from the lower die.

In practice, these dies may be used in the ordinary and well-known electric punch press and the die can be made reversible, the wings being located on the base and the cooperating fixed die blocks on the movable section or punch of the die.

While I have shown and described herein the formation of a band having a raised lengthwise extending panel b for the purpose of taking up variations in the threads of the glass container and having shouldered annular rims d and bent abutting edges 18 with the panel provided with a single thread c starting and terminating adjacent the edges of the panel, it is obvious that other forms of locking means can be provided on the panel and that also various shapes of sectional semi-circular hinged bands can be formed by this improved method and apparatus.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. A die for forming inertable threaded bands for caps or closures for containers and comprising a pair of members movable relatively toward each other, one carrying fixed die elements and the other carrying an elastically controlled shiftable member, a sectional die carried thereby comprising a center section fixed with respect thereto and having a pair of concave arc-shaped peripheries spaced at their inner ends to form a blank engaging portion thereby to provide a hinged connection in the blank, and a pair of shiftable wing sections pivoted to the shiftable member and also having concave arc-shaped peripheries forming continuations of the arc-shaped peripheries of the center section.

2. The method of forming a circular locking band for a closure cap comprising a pair of semi-circular hinge-connected portions having container locking means or a thread and which consists in progressively and in a single operation first clamping a blank strip midway of its length, then exerting pressure thereon from the center thereof outwardly partially to bend the strip upwardly upon itself to form a hinge and a part of the locking means or thread and then exerting further pressure on the remaining outer end portions of the strip to complete the semi-circular portions and the locking means thereof.

3. The method of forming a circular locking band for a closure cap comprising a pair of semi-circular hinge-connected portions having a lengthwise extending raised panel provided with container locking means or thread and which consists in progressively and in a single operation first clamping a blank strip midway of its length, then exerting pressure thereon from the center thereof outwardly partially to bend the strip upwardly upon itself to form a hinge and a part of the locking means or thread and then exerting further pressure on the remaining outer end portions of the strip to complete the semi-circular portions and the locking means thereof.

4. The method of forming a circular locking band for a closure cap comprising a pair of semi-circular hinge-connected portions having a lengthwise extending raised panel provided with container locking means or thread and a pair of annular rims and terminating in a pair of bent ends adapted to abut when the band is bent to circular form, and which consists in progressively and in a single operation first clamping a blank strip midway of its length, then exerting pressure thereon from the center thereof partially to bend the strip upwardly upon itself to form a hinge and a part of the locking means or thread and then exerting further pressure on the remaining outer end portions of the strip to complete the semi-circular portions and the locking means thereof.

5. A die assembly for forming a threaded metal band having a plurality of arcuate sections connected at their adjacent ends by a reversely bent hinge and adapted to be bent into cylindrical shape for insertion into a closure shell, comprising relatively movable die-carrying members, co-operating sets of die elements fixedly carried thereby, one of said sets comprising elongated arcuate convex die surfaces arranged in longitudinal alignment and providing a substantially V-shaped space between their adjacent ends, the other set comprising arcuate concave die surfaces arranged in longitudinal alignment facing the first-mentioned die surfaces and providing a complemental, substantially V-shaped projection adapted to enter said space and to clamp the band and first form the reverse bend and the inner end portions of the arcuate sections upon converging movement of said members, relatively movable die elements carried by one of said members and having surfaces aligned with and constituting arcuate continuations of the other die elements carried thereby and facing the elements of the other set, and means for moving the relatively movable die elements into operative relation to said elements of said other set to form the outer end portions of the arcuate sections after the first-mentioned die elements have completed at least a portion of their functions.

6. A die assembly for forming a threaded metal band having two substantially semi-cylindrical sections connected at their inner ends by a reversely bent hinge and adapted to be bent into cylindrical shape for insertion into a closure shell, comprising relatively movable die carrying members, cooperating sets of die elements fixedly carried thereby, one of said sets comprising elongated arcuate convex die surfaces arranged in longitudinal alignment and providing a substantially V-shaped space between their adjacent ends, the other set comprising arcuate concave die surfaces arranged in longitudinal alignment facing the first-mentioned die surfaces and providing a complemental substantially V-shaped projection adapted to enter said space and to clamp the bend centrally thereof and to first form the reverse bend and the inner end portions of the semi-cylindrical sections upon converging movement of said members, a pair of relatively movable elements carried by one of said members and having surfaces in alignment with and constituting arcuate continuations of the other die elements carried by that member and facing the elements of the other set, and means for moving the relatively movable elements into operative relation to said elements of the other set to form the outer end portions of the semi-cylindrical band sections after the first-mentioned die elements have completed at least a portion of their functions.

7. A die assembly for forming a threaded metal band having two substantially semi-cylindrical sections connected at their inner ends by a reversely bent hinge and adapted to be bent into cylindrical shape for insertion into a closure shell, comprising stationary and movable supports carrying cooperating arcuate dies fixed with respect to their respective supports, the dies carried by one support comprising convex die surfaces positioned in alignment and providing a V-shaped space between their adjacent ends and the dies carried by the other support comprising concave die surfaces positioned in alignment and providing a V-shaped projection adapted to enter said space and shaped to form the inner portions of said semi-cylindrical sections and said reversely bent hinge, one of said supports having pivotally connected thereto a pair of relatively movable dies constituting lateral continuations of the corresponding fixed dies and shaped to form the outer ends of the semi-cylindrical sections, and means for actuating the movable dies after the fixed dies have performed at least a part of their function.

8. A die assembly for forming a threaded metal band having two substantially semi-cylindrical sections connected at their inner ends by a reversely bent hinge and adapted to be bent into cylindrical shape for insertion into a closure shell, comprising a stationary bed having upwardly projecting convex substantially semi-cylindrical die block thereon, a downwardly movable member above the bed carrying relatively fixed arcuate die surfaces shaped to form, with said die blocks, the inner portions of the semi-cylindrical sections adjacent the hinge and a pair of wing members pivoted to the downwardly movable member and having die surfaces constituting continuations of the fixed die surfaces and shaped to form, with said die blocks, the laterally outermost portions of the semi-cylindrical sections.

9. A die assembly for forming a threaded metal band having two substantially semi-cylindrical sections connected at their inner ends by a reversely bent hinge and adapted to be bent into cylindrical shape for insertion into a closure shell, comprising a pair of relatively movable members, one carrying a pair of fixed, spaced apart, convex, substantially semi-cylindrical die blocks, the other member carrying a pair of relatively fixed concave, diverging, substantially quadrant die surfaces shaped to enter the space between the adjacent ends of the convex die blocks to form the reverse bend and the inner portions of the semi-cylindrical band sections, and a pair of movable die members pivotally connected to said other member and having concave, substantially quadrant die surfaces constituting lateral continuations of said relatively fixed die surfaces, and means for urging the movable die members into cooperative relation to the laterally outermost portions of the die blocks, to form the outer end portions of the band sections.

10. A die assembly for forming a threaded metal band having two substantially semi-cylindrical sections connected at their inner ends by a reversely bent hinge and adapted to be bent into cylindrical shape for insertion into a closure shell, comprising a stationary bed, a pair of substantially semi-cylindrical convex die blocks projecting upwardly therefrom, a downwardly movable head above the bed, a slide carried by the head and having arcuate die surfaces fixed with respect thereto and shaped to form, with said die blocks, the inner portions of the semi-cylindrical sections adjacent the hinge, and a pair of wing members pivotally connected to the slide and having concave arcuate die surfaces constituting continuations of the first mentioned arcuate die surfaces and shaped to form, with said die blocks, the outer end portions of the semi-cylindrical sections.

11. A die assembly for forming a threaded metal band having two substantially semi-cylindrical sections connected at their inner ends by a reversely bent hinge and adapted to be bent into cylindrical shape for insertion into a closure shell, comprising a stationary bed, a pair of semi-cylindrical, convex die blocks projecting upwardly therefrom, a downwardly movable head above the bed, a vertically movable slide carried by the head, a yielding connection between the head and the slide, permitting the head to move downwardly relative to the slide when the movement of the slide is arrested, a pair of arcuate die surfaces fixed with respect to the slide and shaped to form, with said die blocks, the inner portions of the semi-cylindrical band sections adjacent the hinge, a pair of wing members pivotally connected to the slide and having concave, arcuate die surfaces constituting continuations of the first mentioned arcuate die surfaces and shaped to form, with said die blocks, the outer end portions of the semi-cylindrical sections, and means for actuating the wing members upon downward movement of the head relative to the slide.

LESLIE R. N. CARVALHO.